US008890959B2

(12) United States Patent
Carlsson

(10) Patent No.: US 8,890,959 B2
(45) Date of Patent: Nov. 18, 2014

(54) CONFIGURATION OF IMAGE CAPTURING SETTINGS

(71) Applicant: Axis AB, Lund (SE)

(72) Inventor: Stefan Carlsson, Loddekopinge (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 14/026,694

(22) Filed: Sep. 13, 2013

(65) Prior Publication Data

US 2014/0078315 A1      Mar. 20, 2014

Related U.S. Application Data

(60) Provisional application No. 61/703,466, filed on Sep. 20, 2012.

(30) Foreign Application Priority Data

Sep. 14, 2012   (EP) .................................... 12184468

(51) Int. Cl.
| H04N 17/00 | (2006.01) |
| H04N 5/232 | (2006.01) |
| H04N 7/18 | (2006.01) |
| G08B 13/196 | (2006.01) |

(52) U.S. Cl.
CPC ............ H04N 17/002 (2013.01); H04N 5/232 (2013.01); H04N 5/23222 (2013.01); H04N 7/18 (2013.01); G08B 13/1968 (2013.01)
USPC ......................................... 348/187; 348/188

(58) Field of Classification Search
CPC ... H04N 17/002; H04N 17/00; H04N 17/004; H04N 1/32101; H04N 5/232; H04N 5/23216

USPC ............. 348/175, 176, 187, 188, 241, 226.1, 348/227.1, 135; 702/81, 104, 116
See application file for complete search history.

(56) References Cited

U.S. PATENT DOCUMENTS 4,523,231 A * 6/1985 Therrien ........................ 348/187
4,962,425 A * 10/1990 Rea ............................... 348/187
(Continued)

FOREIGN PATENT DOCUMENTS

| EP | 1 876 828 A1 | 1/2008 |
| EP | 2 154 630 A1 | 2/2010 |

OTHER PUBLICATIONS

European Search Report issued Feb. 5, 2013 in European Patent Application No. 12184468.2-1241, 8 pages.

(Continued)

Primary Examiner — Victor Kostak
(74) Attorney, Agent, or Firm — Oblon, Spivak, McClelland, Maier & Neustadt, L.L.P.

(57) ABSTRACT

There is provided a method for configuring a set of image capturing settings of a camera for a first scene condition type currently viewed by the camera. The method comprises detecting the first scene condition type; instructing the camera to acquire a plurality of test images, each test image corresponding to a set of image capturing settings; receiving input relating to a selected test image, and storing the set of image capturing settings corresponding to the selected test image as the configured set of image capturing settings for the first scene condition type to be used by the camera upon future detections of the first scene condition type.

15 Claims, 5 Drawing Sheets

(56) References Cited

U.S. PATENT DOCUMENTS

| | | | | |
|---|---|---|---|---|
| 4,979,135 | A * | 12/1990 | Moy | 700/259 |
| 4,991,007 | A * | 2/1991 | Corley | 348/188 |
| 5,760,829 | A * | 6/1998 | Sussmeier | 348/187 |
| 6,301,440 | B1 | 10/2001 | Bolle et al. | |
| 6,980,231 | B1 * | 12/2005 | Ohsawa | 348/188 |
| 7,200,497 | B2 * | 4/2007 | Wang et al. | 702/57 |
| 7,629,998 | B2 * | 12/2009 | Elberbaum | 348/187 |
| 8,111,942 | B2 | 2/2012 | Farrer et al. | |
| 8,395,666 | B1 * | 3/2013 | Steinberg et al. | 348/188 |
| 8,436,904 | B2 * | 5/2013 | Li et al. | 348/187 |
| 2004/0032496 | A1 * | 2/2004 | Ebenstein et al. | 348/187 |

OTHER PUBLICATIONS

Axis Communications Prior Art Search Report—P120032, Search Date: Jun. 6, 2012 and Delivery Date: Jun. 11, 2012, 16 pages.

* cited by examiner

CONFIGURATION OF IMAGE CAPTURING SETTINGS

CROSS-REFERENCE TO RELATED APPLICATIONS

This application claims the benefit of priority under 35 U.S.C. §120 to U.S. Provisional Application No. 61/703,466, filed Sep. 20, 2012, and claims the benefit of priority under 35 U.S.C. §119 to European Patent Application No. 12184468.2, filed Sep. 14, 2012. The entire contents of each of which are incorporated herein by reference.

TECHNICAL FIELD

The present invention relates to the field of cameras. In particular it relates to configuration of image capturing settings of a camera.

BACKGROUND

It has become increasingly popular to use video cameras for surveillance. Typically a video camera is mounted at a location in order to acquire images of the location 24 hours a day. The video camera must hence be capable of acquiring images at very different conditions, such as different light conditions caused by varying sun direction, changing weather conditions, shadows, the indoor lighting being turned on/off, the headlights of a car on a parking lot during the night, different light sources being directed in different directions generating complex illumination of the scene monitored by the camera etc. The video camera should also be capable of acquiring images of a crowed scene with a lot of people or objects moving around or scenes with no or only a few objects in motion.

A problem arising with such video cameras is that it is difficult to configure the image capturing settings of the camera since the camera is used under many different conditions. The person installing the camera may for example only see typical daytime conditions when setting up the camera and the image capturing settings will then be optimized to fit only these conditions.

U.S. Pat. No. 8,111,942 B1 discloses a system for adjusting the settings of a camera. The settings are adjusted by acquiring an image and comparing it to a reference image. The settings are adjusted based on the comparison and a new image is acquired. This procedure may be repeated until an acceptable image is acquired.

The system of U.S. Pat. No. 8,111,942 has a drawback in that several images typically have to be acquired each time the camera is to acquire an image in order to find an appropriate setting. Another drawback is that it is difficult to use this method for optimizing several image setting parameters as this would require several iterations and it would be difficult to account for interdependencies between different image setting parameters. Yet another drawback is that different locations where the camera is mounted might expose the camera to different conditions which implies that it may be difficult to use a single reference image for all conditions and locations to set the image setting parameters. There is thus need for improvements.

SUMMARY OF THE INVENTION

In view of the above, it is thus an object of the present invention to provide an improved method for configuring image capturing settings of a camera.

According to a first aspect of the invention, the above object is achieved by a method for configuring a set of image capturing settings of a camera for a first scene condition type currently viewed by the camera, comprising: detecting the first scene condition type currently viewed by the camera, instructing the camera to acquire a plurality of test images for the first scene condition type, wherein each of the plurality of test images corresponds to a set of image capturing settings to be used by the camera, and wherein at least two test images correspond to different sets of image capturing settings, storing each of the plurality of test images together with its corresponding set of image capturing settings and data representing the first scene condition type, receiving input relating to one test image which has been selected from the plurality of test images according to a first predefined criteria, and storing the set of image capturing settings corresponding to the selected test image as the configured set of image capturing settings for the first scene condition type to be used by the camera upon future detections of the first scene condition type.

The appearance of an image may be altered by changing the image setting parameters. However, it may be difficult to predict how the appearance changes with changes in the image settings parameters and it may also be difficult to predict how interdependencies between different image setting parameters affect the appearance of the image. By selecting a test image having a desirable appearance and using the set of image capturing settings used for acquiring the selected test image that problem is circumvented.

As a result of the above method, there is stored a configured set of image capturing settings for the first scene condition type. Upon future detections of the first scene condition type, the camera may use the stored configure set of image capturing settings. Hence, upon future detection of the first scene condition type there is no need to capture several images in order to find out which image capturing settings to use.

By repeating the above method during a time interval, such as during several days or even during a year, a configured set of image capturing settings may be stored with respect to each scene condition type occurring during the interval. In this way, the camera may be configured for different scene condition types such as varying light conditions. In other words, the camera may be configured with respect to temporal changes of the scene type conditions.

Since the plurality of test images is stored, the selection of the "best" test image need not be performed in real time. More precisely, test images relating to a plurality of scene condition types reflecting the temporal variation of scene type conditions may be stored and evaluated at a later time. Consequently, the collection of test images may be carried out for a period of time, such as during an installation period of a few days, without any installation personnel present.

By scene condition is generally meant a condition in a scene. This may for example refer to a light condition, a level of motion in the scene, a type of objects in the scene etc. A scene condition may also refer to a condition in a scene as seen through a camera, such as the noise or the motion blur in an image of the scene.

The scene conditions may be categorised into different types, herein referred to as scene condition types. In this sense, the first scene condition type may relate to at least one particular scene condition, such as at least one of a first light condition type, a first motion blur type, a first image noise condition type, and a first type of objects in the scene. For example the first light condition type may be represented by a histogram of light intensities.

The camera may capture images using different sets of image capturing settings. Each set of image capturing settings may include settings relating to at least one of brightness, contrast, color saturation, white balance, gain, flicker free, exposure time, on/off of wide dynamic range, backlight compensation, on/off of infrared cut filter.

Flicker free is here referred to as a parameter which may be used for adapting the image capture mode to the illumination source present in the scene in order to remove flicker from the video images. Fluorescent light sources may for example generate flicker in the video images and the flicker-free parameter may for example be set to 50 or 60 Hz, depending on the power line frequency, to adapt to the illumination source.

Wide Dynamic Range (WDR) is here referred to as a parameter which may be used for turning on/off an image processing technology to improve the dynamic range of images recorded by the camera. The technology may for example be implemented using multi-exposure methods and may also be called High Dynamic Range (HDR) or Extended Dynamic Range technology. The WDR parameter is typically recommended to be turned on when having intense backlight illumination conditions.

Infrared cut filter is sometimes referred to as a day/night mode.

The method may further comprise detecting, at a later point in time, that the camera views the first scene condition type, and instructing the camera to acquire an image using the stored configured set of image capturing settings for the first scene condition type. This is advantageous in that the camera may reuse the configured set of image capturing settings each time the first scene condition type is detected.

The method may further comprise determining that there is no previously stored configured set of image capturing settings for the first scene condition type before instructing the camera to acquire a plurality of test images for the first scene condition type. This is advantageous in the camera continuously during normal operation may configure sets of image capturing settings for scene condition types that have not previously been encountered. More precisely, during normal operation the camera continuously analyzes the scene conditions to detect the current scene condition type. If there is a previously stored configured set of image capturing settings for the current scene condition type, the configured set of image capturing settings is used when acquiring images and no test images need to be acquired. However, if there is no configured set of image capturing settings for the current scene condition type, test images are acquired in order to determine a configured set of image capturing settings as described above.

The first scene condition type currently viewed by the camera may be detected by analyzing a temporary image acquired by the camera and determining data representing the first scene condition type. This is advantageous in that it provides a simple way of detecting the first scene condition type.

The temporary image may for example be analyzed by analyzing an image histogram of light intensities of the temporary image. In this way each scene condition type reflects the light conditions in the scene. Accordingly, the configured set of image capturing settings may be optimized with respect to different light conditions in the scene.

In some embodiments the sets of image capturing settings corresponding to the test images are the same regardless of what scene condition type has been detected. In other embodiments, the method further comprises selecting a plurality of sets of image capturing settings to be used by the camera when acquiring the plurality of test images for the first scene condition type, wherein said plurality of sets of image capturing settings are selected based on said temporary image and/or said first scene condition type. This is advantageous in that the sets of image capturing settings used when capturing the plurality of test images are selected in an intelligent way. More precisely, the sets of image capturing settings may be selected with respect to the current scene type condition. In this way, the resulting test images will have a better image quality, i.e., being closer to a desired image quality compared to if the current scene type condition is not taken into account. In the end this leads to a more efficient method since test images having a poor image quality need not be considered in the selection of one test image. Further, the precision of the resulting configured set of image capturing settings is improved since there are several test images having an image quality close to a desired image quality to choose from.

The plurality of sets of image capturing settings may be selected from a range comprising an expected set of image capturing settings, wherein the expected set of image capturing settings is determined, according to a second predefined criteria, based on said temporary image, and wherein said range is a range in a parameter space in which each set of image capturing settings defines a point. The expected set of image capturing settings may for example correspond to a set of image capturing settings being automatically selected according to procedures known in the art. This is advantageous in that it provides an efficient way of selecting the sets of image capturing settings to be used when acquiring the test images.

Sometimes there is a particular object or location in the scene for which is particularly important to have a good image quality and for which the set of image capturing settings should be optimized. For example, the particular object or location may be a face of a person, an entrance to be monitored, or a stationary object to be monitored. If so, the expected set of image capturing settings may be determined with respect to a reference object, such as the particular object or location in the scene, being present in the temporary image. In particular, the expected set of image capturing settings may be optimized in accordance with the second predefined criteria for the position of the reference object in the temporary image.

In some embodiments, the position of the reference object in the temporary image is identified prior to determining the expected set of image capturing settings. For example, the face of a person may be identified in the temporary image. The reference object may also be a stationary object being placed in the scene for the sole purpose of serving as a reference object when determining the expected set of image capturing settings. The reference object may hence serve as a calibration object.

In some cases there may be a large number of test images from which a single test image is to be chosen. In order to simplify the selection of one test image from the plurality of test images it may be advantageous to perform the selection in a sequential manner. The method may allow such sequential selection by further comprising: dividing the plurality of test images into groups based on their corresponding sets of image capturing settings, receiving input relating to one of the groups which has been selected based on said first predefined criteria, and receiving input relating to one test image which has been selected from the selected group based on said first predefined criteria. The selection may hence be accomplished by first selecting a group of test images and then selecting one test image from the selected group. Each group may for example be represented by one representative test image in order to further simplify the selection.

According to a second aspect of the invention, the above object is achieved by an apparatus for configuring a set of image capturing settings of a camera for a first scene condition type currently viewed by the camera, comprising: a detector unit arranged to detect the first scene condition type currently viewed by the camera, a camera instructing unit arranged to instruct the camera to acquire a plurality of test images for the first scene condition type, wherein each of the plurality of test images corresponds to a set of image capturing settings to be used by the camera, and wherein at least two test images correspond to different sets of image capturing settings, a first storing unit arranged to store each of the plurality of test images together with its corresponding set of image capturing settings and data representing the first scene condition type, a selection receiving unit arranged to receive input relating to one test image which has been selected from the plurality of test images according to a predefined criteria, and a second storing unit arranged to store the set of image capturing settings corresponding to the selected test image as the configured set of image capturing settings for the first scene condition type to be used by the camera upon future detections of the first scene condition type.

According to a third aspect of the invention, the above object is achieved by a camera comprising an apparatus according to the second aspect.

According to a fourth aspect of the invention, the above object is achieved by a system for configuring a set of image capturing settings of a camera for a first scene condition type currently viewed by the camera, comprising: a camera, and an apparatus according to the second aspect.

According to a fifth aspect of the invention, the above object is achieved by a digital storage medium comprising computer code instructions which when loaded and executed in a device having processing capabilities performs the method according to the first aspect. The digital storage medium may in particular be a non-transitory digital storage medium.

The second, third, fourth and fifth aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, parameter, step etc.]" are to be interpreted openly as referring to at least one instance of said device, parameter, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. The systems and devices disclosed herein will be described during operation.

Figure 1:
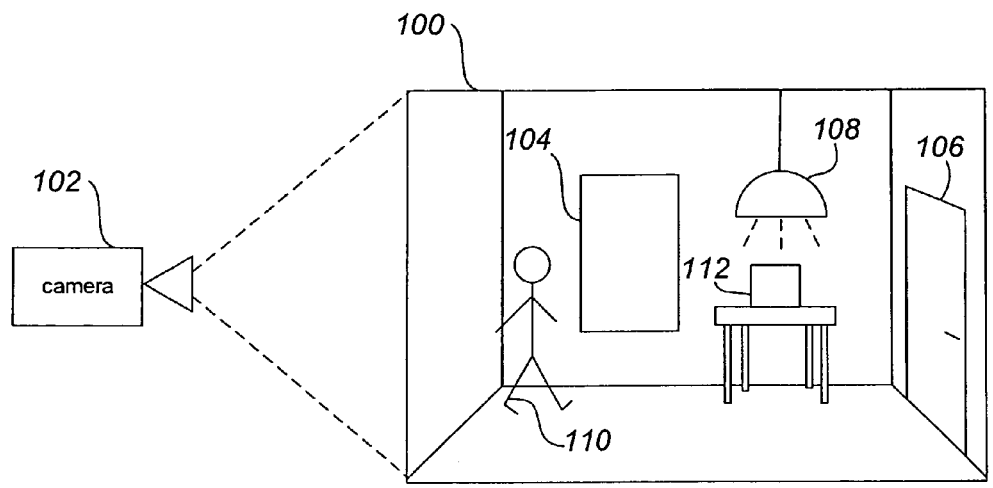
FIG. 1 schematically illustrates a scene as viewed by a camera.

FIG. 1 illustrates a scene 100 as seen by a camera 102. For example, the camera 102 may be a surveillance camera capturing images of the scene in order to monitor the scene 100. Typically, the camera 102 is a video camera capturing a plurality of images per time unit.

Generally, the scene 100 may be any environment of which the camera 102 may capture images. Here the scene 100 is illustrated by a room. The room comprises a window 104, a door 106, a light source 108, moving objects 110 such as a person, and stationary objects 112.

The scene 100 may be subject to different conditions, herein referred to as scene conditions. For example, the scene 100 may be subject to different light conditions depending on whether the light source 108 is on or off, it is day or night outside the window 104, the door 106 is open or closed etc. Similarly, the scene 100 may be subject to different level of motion depending on whether there are moving objects 110 in the scene, the door 106 is opened, someone is passing by outside of the window 104 etc. Also, a scene condition may relate to the type of objects present in the scene 100, such as if there are persons in the scene 100 or if there are only stationary objects in the scene 100.

The scene conditions may be categorised into different types, herein referred to as scene condition types. In this sense, each scene condition type represents a particular scene condition, such as a particular light condition, a particular level of motion, a typical type of objects being present in the scene or combinations thereof. A scene condition type may be represented by set of parameters. Typically the set of parameters, and thereby the scene condition type, may be detected by analyzing an image captured by the camera 102. For example, the scene condition type may be represented by a histogram of light intensities of an image captured by the camera 102, by the motion blur of an image captured by the camera 102, by the noise present in an image captured by the camera 102, or by a value representing the type of object present in an image captured by the camera 102.

Figure 2:
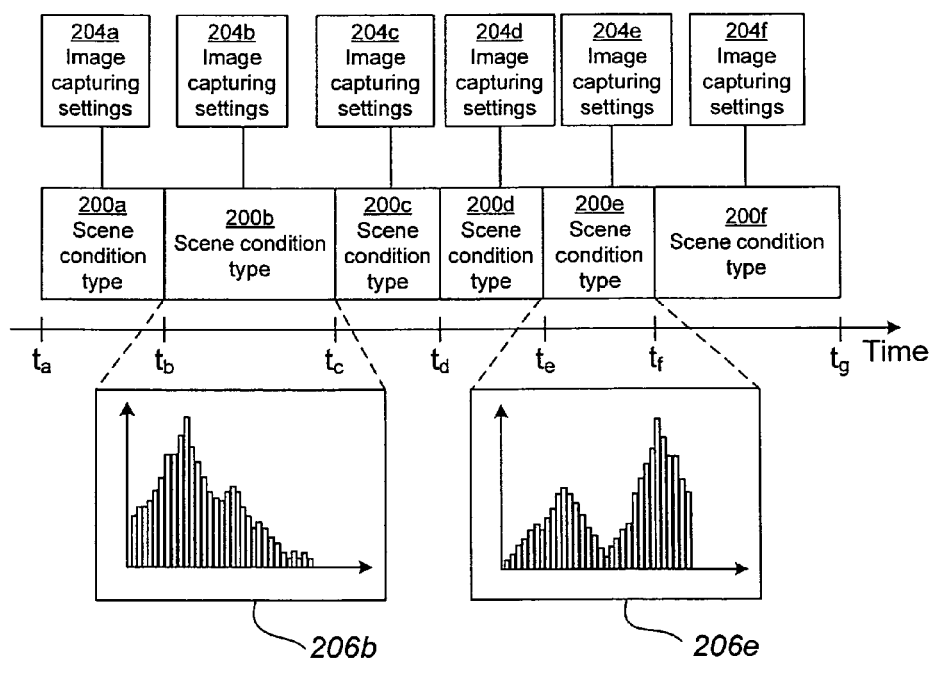
FIG. 2 schematically illustrates the time variation of the scene condition type of a scene, FIGS. 3a-b schematically illustrate a system according to embodiments of the invention.

As is evident from the above examples, the scene condition type varies over time due to varying light conditions, level of motion in the scene 100 etc. FIG. 2 illustrates a time line with times $t_a < t_b < t_c < t_d < t_e < t_f < t_g$ and scene condition types 200a-f. During the time period starting at $t_a$ and ending at $t_b$ the scene condition type is essentially constant and corresponds to scene condition type 200a. Similarly, during the following time periods, $t_b$ to $t_c$, $t_c$ to $t_d$, $t_d$ to $t_e$, $t_e$ to $t_f$, $t_f$ to $t_g$, the scene condition type is essentially constant and corresponds to scene condition types 200b-f respectively. In FIG. 2 each scene condition type is represented by a histogram of light intensities of an image captured by the camera 102. In particular, scene condition type 200b is represented by a histogram 206b and scene condition type 200e is represented by a histogram 206e.

The camera 102 may capture images using different sets of image capturing settings. Examples of image capturing settings are brightness, contrast, color saturation, white balance, gain, flicker free, exposure time, on/off of wide dynamic range, backlight compensation, and on/off of infrared cut filter. A set of image capturing settings may preferably include at least one of these image capturing settings.

Since the scene condition type 200a-f, such as the type of light condition, varies over time it is desirable to also vary the set of image capturing settings used when capturing images of the scene 100. For this purpose, each scene condition type 200a-f is preferably associated with one configured set of image capturing settings 204a-f to be used each time the associated scene condition type is detected. In the following it will be described how to configure a set of image capturing settings 204a-f for a respective scene condition type 200a-f.

Figure 3A:
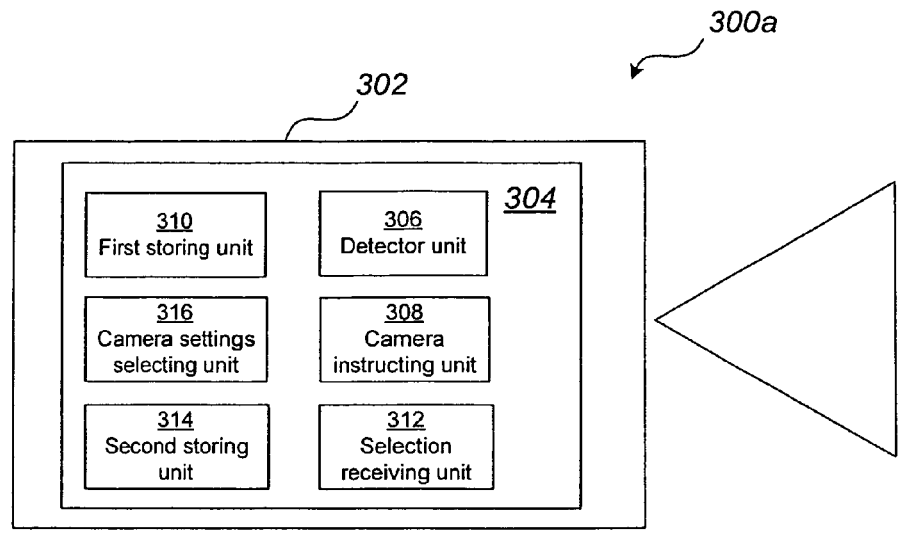
Figure 3B:
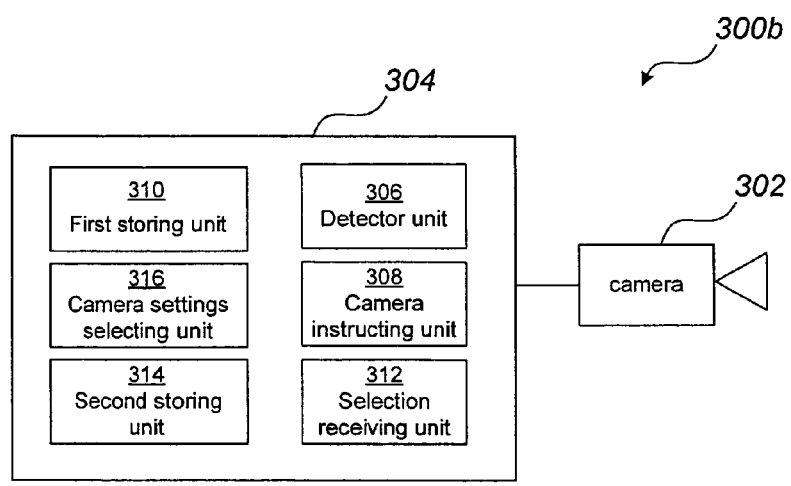
Figure 4:
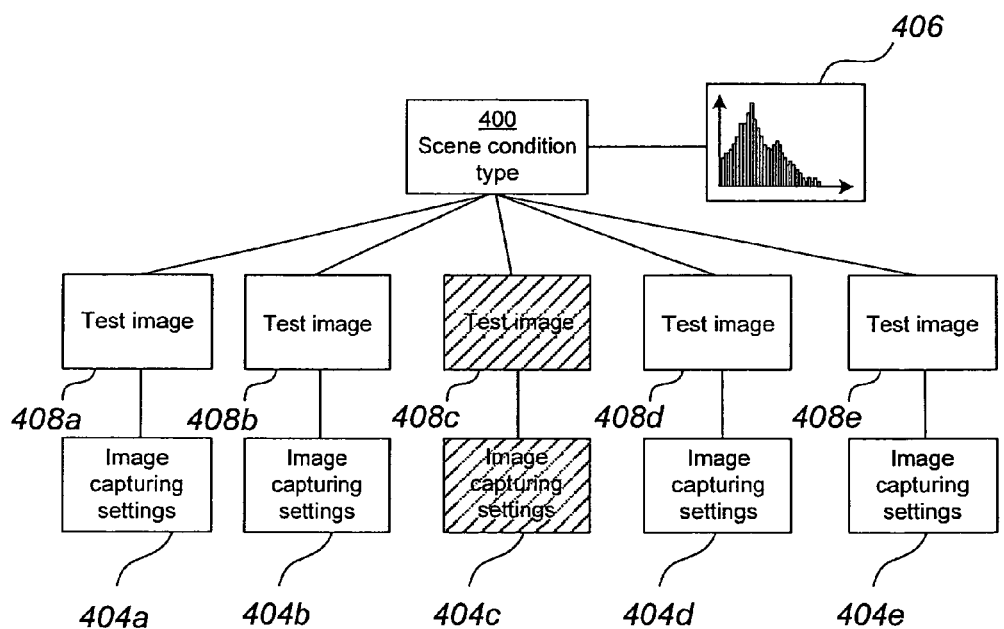
FIG. 4 schematically illustrates test images captured with respect to a first scene condition type according to embodiments of the invention, FIG. 5 schematically illustrates ranges of image capturing settings from which a plurality of sets of image capturing settings are selected according to embodiments of the invention, FIG. 6 schematically illustrates a hierarchy of groups of test images, from which test images are selected according to embodiments of the invention.

FIGS. 3a-b illustrate systems 300a, 300b, for configuring a set of image capturing settings. The systems 300a, 300b comprise a camera 302 to be configured, and an apparatus 304 for configuring a set of image capturing settings of the camera 302. The camera 302 corresponds to the camera 102 of FIG. 1. The apparatus 304 may be comprised in the camera 302 as is the case in FIG. 3a or may be a separate unit as is the case in FIG. 3b. For example the apparatus 304 may be connected to the camera 302 via a network. Further, the apparatus 304 may be connected to several cameras in order to configure a set of image capturing settings of several cameras.

The apparatus 304 comprises a detector unit 306, a camera instructing unit 308, a first storing unit 310 (e.g. a first memory), a selection receiving unit 312, and a second storing unit 314 (e.g. a second memory). The camera may further comprise an camera settings selecting unit 316.

The detector unit 306, the camera instructing unit 308, the selection receiving unit 312, and the camera settings selecting unit 316 may be implemented in hardware or software. In particular, the detector unit 306, the camera instructing unit 308, the selection receiving unit 312, and the camera settings selecting unit 316 may have processing capabilities, for example in the form of a processing unit. In the case of a software implementation, these units may specifically process computer code instructions stored on a digital storage medium in order to perform the method steps disclosed herein.

The camera 302 may operate in different modes. In one mode, herein referred to as a learning mode, the camera 302 may via the apparatus 304 learn which set of image capturing settings 204a-f to be used with which scene condition type 200a-200f. In other words, when being in the learning mode the camera 302 via the apparatus 304 determines a configured set of image capturing settings 204a-f for each detected scene condition type 200a-f.

In another mode, herein referred to as a normal operation mode, the camera 302 uses the configured set of image capturing settings 204 a-f when capturing images of the scene.

In the following the learning mode will be described in more detail. Particularly, a method for configuring a set of image capturing settings of a camera for a first scene condition type will be described with reference to the flow chart of FIG. 7 and FIGS. 2-6.

In step S02 the detector unit 306 detects a first scene condition type. The first scene condition type is the scene condition type currently viewed by the camera 302. In this example the first scene condition type is the scene condition type 400 of FIG. 4. The first scene condition type 400 may correspond to any of the scene condition types 200a-f of FIG. 2. The first scene condition type 400 may be detected based on a temporary image acquired by the camera 302. For this purpose, the camera instructing unit 308 may instruct the camera 302 to acquire a temporary image. The temporary image may be acquired using a reference set of image capturing settings. The detector unit 306 may then analyze the temporary image in order to determine data representing the first scene condition type 400. For example, the data representing the first scene condition type 400 may comprise a histogram 406 of light intensities or summary statistics such as mean value and standard deviation thereof. Thus, the detector unit 306 may analyze the light intensities in the temporary image to determine a histogram 406. Similarly, the data representing the first scene condition type 400 may comprise data representing the motion blur in the temporary image, data representing the noise level in the temporary image, and/or data relating to the type of objects present in the scene.

In step S04 the camera instructing unit instructs the camera 302 to acquire a plurality of test images 408a-e for the first scene condition type 400 that was detected by the detector unit 306 in step S02. The number of test images may be any number. The number of test images may depend on the data representing the first scene condition type 400. For example, if the histogram 406 is highly peaked, i.e., corresponds to a small standard deviation it may be enough to acquire a few test images.

Each test image 408a-e is acquired by the camera 302 using a set of image capturing settings 404a-e. Each test image 408a-e thus corresponds to a set of image capturing settings 404a-e. At least two of the test images 408a-e, such as test images 408b-c, have corresponding sets of image capturing settings 404a-e which are different. In some embodiments all of the corresponding sets of image capturing settings 404a-e are different.

The camera settings selecting unit 316 may select the sets of image capturing settings 404a-e to be used by the camera 302 when acquiring the test images 408-e. For example, the sets of image capturing settings 404a-e may be selected as a predefined set of image capturing settings which is used to capture the test images 408a-e regardless of which scene condition type has been detected. Preferably, however, the sets of image capturing settings 404a-e are selected based the first scene condition type 400, such that different sets of image capturing settings 404a-e would be selected for different scene condition types. For example, the sets of image capturing settings may be selected based on the temporary image that was used to detect the first scene condition type 400.

As is well known in the art there are methods for automatically selecting a set of image capturing settings from a temporary image. Such an automatically selected set of image capturing settings may be expected to provide a fairly good quality of the acquired image, although not necessarily an optimal image quality. The camera settings selecting unit 316 may apply such an automatic method to the temporary image used when detecting the first scene condition type 400 in order to determine an expected set of image capturing settings with respect to the first scene condition type 400. The expected set of image capturing settings is thus selected according to a predefined criteria defined by the automatic method used.

In some embodiments, the expected set of image capturing settings may be determined with respect to a reference object being present in the temporary image. For example, the reference object may be an object which is located in the scene 100 of FIG. 1, such as a face of the person 110 or a stationary object 112 which is placed in the scene for serving as a calibration object.

The camera settings selecting unit 316 may use the expected set of image capturing settings in order to define a range from which the sets of image capturing settings 408a-408e are selected. This will now be described in more detail with reference to FIG. 5.

Figure 5:
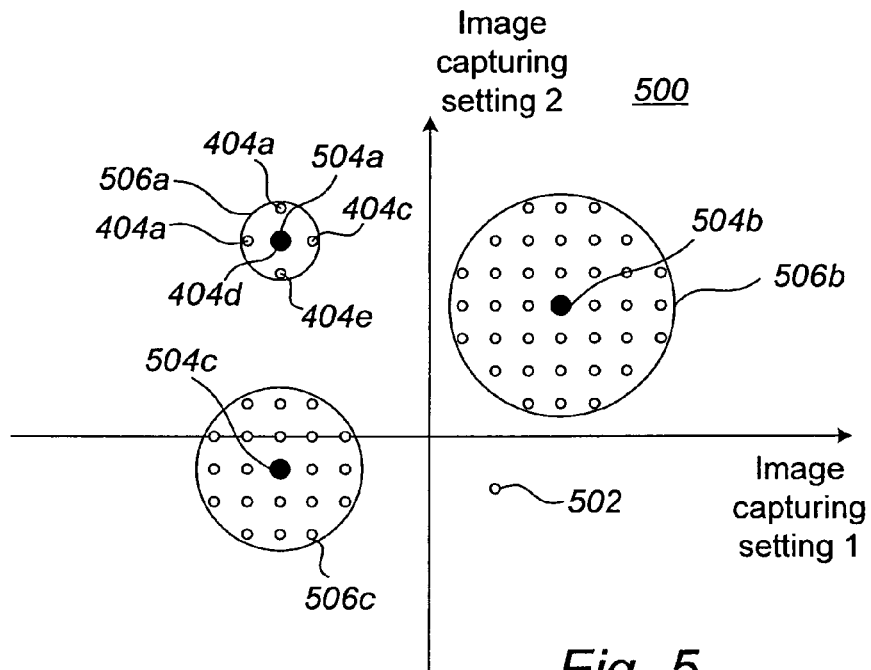

FIG. 5 illustrates a parameter space 500. For illustration reasons, a two-dimensional parameter space 500 is shown although the skilled person realizes that it easily may be extended to any dimension. Each dimension of the parameter space corresponds to an image capturing setting in the set of image capturing settings used by the camera 302 when capturing an image. Each point in the parameter space, such as point 502, thus defines a set of image capturing settings. For example, each point 502 in the two-dimensional parameter space 500 may define a value of brightness and contrast used by the camera 302 when acquiring an image.

FIG. 5 further shows a plurality of expected sets of image capturing settings 504a-c being associated with different scene condition types, such as any of the scene condition types 200a-f of FIG. 2. Each expected set of image capturing settings 504a-c is further associated with a range 506a-c. Notably different scene condition types may be associated with different expected sets of image capturing settings 504a-c and ranges 506a-c. In this example the expected set of image capturing settings 504a and the range 506a correspond to the first scene condition type 400 of FIG. 4.

Based on the temporary image used when detecting the first scene condition type 400 the camera settings selecting unit 316 hence determines the expected set of image capturing settings 504a by applying the above-discussed automatic method. Further, the camera settings selecting unit 316 defines the range 506a. The range 506a comprises the expected set of image capturing settings 504a. For example, as in the illustrated example, the range 506a may be centered about the expected set of image capturing settings.

The range may be selected based on the histogram of the temporary image. Alternatively, or additionally, the range may be selected based on a trial-and-error procedure. For example a set of temporary images may be acquired based on a first range. The set of temporary images may be analyzed with respect to image characteristics such as the image histogram. Depending on the result of the analysis the first range may be modified and a new set of temporary images may be acquired. This procedure may be repeated until a range is reached for which the acquired set of temporary images has desirable image characteristics.

The camera settings selecting unit 316 then selects a plurality of sets of image capturing settings 404a-e from the range 506a. In the illustrated example one of the selected set of image capturing settings 404d corresponds to the expected set of image capturing settings 504a. In general, the expected set of image capturing settings 504a need not form part of the selected sets of image capturing settings 404a-e. The selected sets of image capturing settings 404a-e are then used by the camera 302 when acquiring the plurality of test images 408a-e as discussed above.

In step S06 each of the plurality of test images 408a-e are stored in the first storing unit 310 together with its corresponding set of image capturing settings 404a-d and data representing the first scene condition type 400.

In step S08 the selection receiving unit 312 receives input relating to one test image which has been selected from the plurality of test images 408a-f. In the illustrated example, the test image 408c is the selected test image.

In some embodiments the apparatus 304 sorts out one or more of the plurality of test images 408a-f prior to performing step S08. For example, one or more test images may be sorted out based on the characteristics of their image histograms, such as if the image is saturated. In this way the number of test images to be automatically or manually selected from is reduced.

The selection may be made manually, for example by an operator, and is input to the selection receiving unit 312. The selection receiving unit 312 may serve as an interface, such as a graphical user interface, via which an operator may input a selection of a selected test image 408c. The interface may further comprise a display on which the test images 408a-e may be displayed to the operator in order to facilitate his selection. The selection is based on a predefined criteria. In the case of manual selection, the criteria may be to select the image among the test images 408a-e being most suitable for surveillance purposes.

Alternatively, the selection may be made automatically by a selection unit (not shown) which may input its selection to the selection receiving unit 312. Such a selection unit may be part of the apparatus 304. For example the selection unit may analyze the plurality of test images 408a-e in order to determine properties of the test images 408a-e. The determined properties may be compared to desired reference properties stored in a memory. The properties may relate to a histogram of light intensities, a level of motion blur etc. The selection may comprise selecting the test image having properties that are most similar to the reference properties.

In some cases there may be a large number of test images 408a-e to select from. In order to simplify the selection in such cases the selection may be performed in a sequential manner to be further described with reference to FIG. 6.

Figure 6:
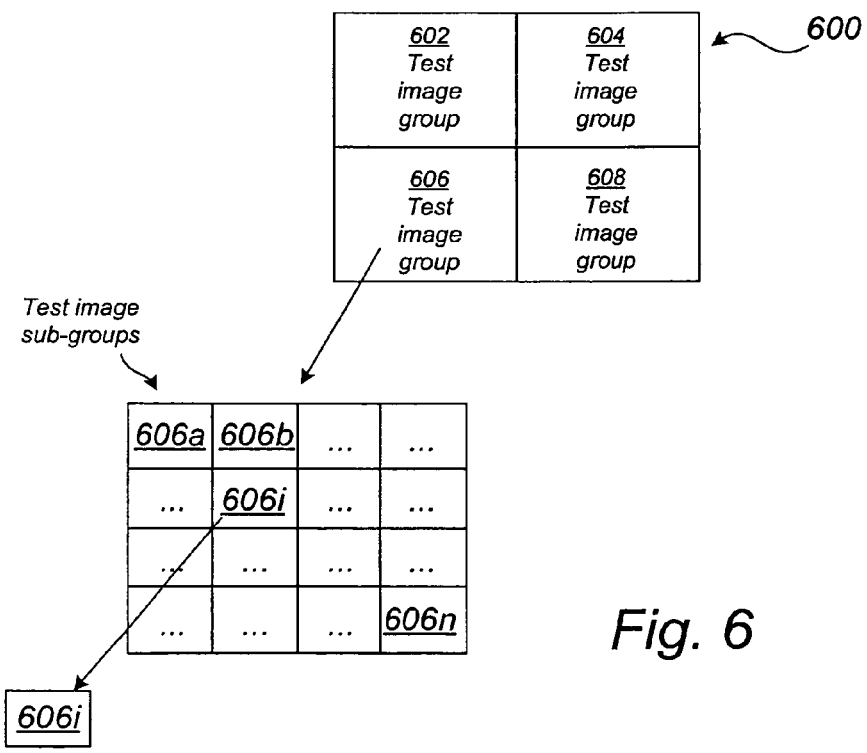
Figure 7:
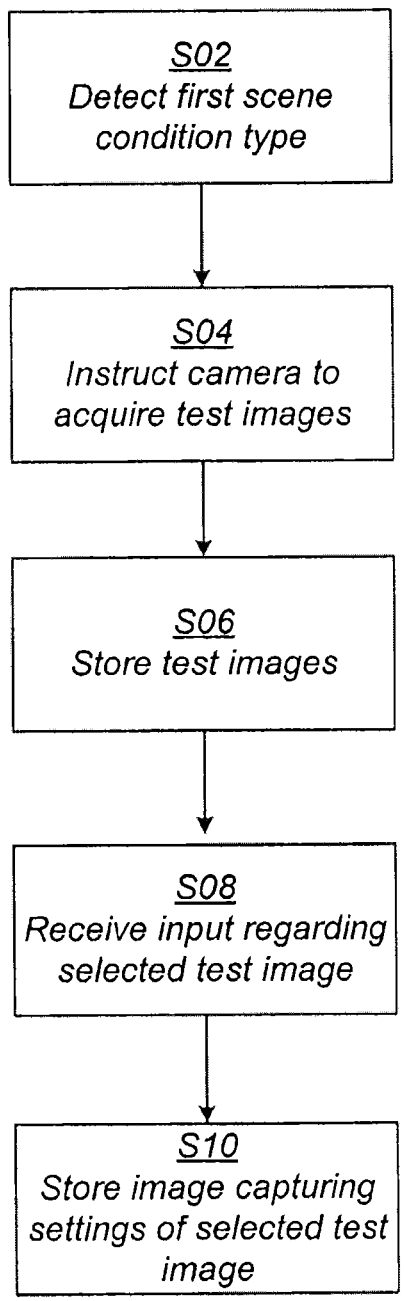
FIG. 7 is a flow chart of a method according to embodiments of the invention.

FIG. 6 illustrates a plurality of test images 600. The plurality of test images may be divided into groups, for example by the selection receiving unit 312. The number of groups may be chosen depending on the number of test images. Here the test images 600 are divided into four groups 602, 604, 606, and 608. The test images 600 may be divided into groups based on their corresponding sets of image capturing settings. For example, test images having sets of image capturing settings being close to each other, such as falling within a common predefined interval in the parameter space 500 of FIG. 5, may form part of the same group 602, 604, 606, or 608. Alternatively, or additionally, the test images 600 may be divided into groups based on properties of the test images 600, such as the light intensity in the test images, the level of noise in the test images, or the level of motion in the test images 600. One test image may be selected from each group 602, 604, 606, 608 as a representative of that group.

The selection receiving unit 312 may then receive input relating to one of the groups 602, 604, 606, 608 which has been selected. The representative test image may serve as a basis for the selection made between the groups 602, 604, 606, 608. For example, the representative test images may be displayed to an operator which manually selects between the groups 602, 604, 606, 608. Alternatively, the representative test images may be compared to a reference image to allow automatic selection among the groups 602, 604, 606, 608. In the illustrated example group 606 is input to the selection receiving unit 312 as the selected group.

The selected group 606 in turn comprises a plurality of sub-groups 606a-n of test images. Each sub-group 606a-n may be a group of several test images. If so, the selection receiving unit 312 may receive an input relating to a selected sub-group. In the illustrated example, sub-group 606i is selected. As the skilled person realizes the above procedure may be repeated until the selected sub-group comprises a single test image. In the illustrated example, the sub-group 606i is assumed to comprise a single test image 606i.

Eventually, after repeating the above procedure until the selected sub-group comprises a single test image, the selection receiving unit 312 thus receives input relating to one test image 606i which has been selected.

The above sequential procedure for selecting test images is efficient and reduces the time and effort of selecting among the test images.

In step S10 the set of image capturing settings 404c corresponding to the selected test image 408c is stored in the second storing unit 314 as the configured set of image capturing settings for the first scene type condition 400. Typically, the configured set of image capturing settings 404c is stored in the second storing unit 314 together with data representing the first scene condition type 400.

The above method has been described with respect to a first scene condition type 400. However, it is to be understood that the method may be applied repeatedly in order to configure sets of image capturing settings for a plurality of scene condition types. For example, with reference to FIG. 2, the method may be applied continuously during a time interval $t_a$-$t_g$ in order to configure a set of image capturing settings 204a-b for each scene condition type 200a-f detected during the time interval $t_a$-$t_g$. The time interval $t_a$-$t_g$ may correspond to an installation period of the camera during which the camera 302 learns about the scene condition types which typically are present in the scene.

Moreover, the method may be applied as soon as a new scene condition type is detected, i.e., as soon as a scene condition type for which no configured set of image capturing settings is stored. For this purpose, the detector unit 306 may determine that there is no previously stored configured set of image capturing settings for a detected scene condition type prior to the camera instructing unit 308 instructing the camera 302 to acquire a plurality of test images for the detected scene condition type.

When the camera 302 is in a normal operation mode it may use the configured sets of image capturing settings, such as the image capturing settings 204a-f of FIG. 2a, that were stored in the second storing unit 314 during the learning mode. More specifically, when being in the normal operation mode, the detector unit 306 continuously detects and analyzes the current scene condition type viewed by the camera 302. If the detector unit 306 detects that the camera 302 views the first scene condition type (or, with reference to FIG. 2, any other scene condition type 200a-f having a set of configured image capturing settings 204a-f stored in the second storing unit 314) the camera instructing unit 308 instructs the camera 302 to acquire an image using the stored configured set of image capturing settings for the first scene condition type.

The detection may generally be performed according to the techniques described above with respect to the learning mode. For example, a detector unit 306 may analyze a temporary image in order to determine data representative of the scene condition type. The data representative of the scene condition type may then be compared to data representative of the scene condition types stored in the second storing unit 314. In this way the detector unit 306 may determine which scene condition type 200a-f was detected and which configured set of image capturing settings 204a-f to be used by the camera 302.

Typically, the camera 302 is in the learning mode for longer periods, such as upon installation of the camera 302 or during periods when the camera 302 does not record any images, such as during night time etc. However, it is also possible that the camera 302 continuously switches between the operating mode and the learning mode, for example as soon as a new scene condition type is detected as described above.

A problem which arises due to such switching, that is, with running the camera 302 in learning mode during normal operation of the camera 302, is when video images from the camera 302 needs to be analyzed or recorded at the same time as test images needs to be acquired by the camera. The test images, testing different image settings, might reduce the visibility of the video image and affect the result of the video analysis algorithms or the image quality of the recorded video.

A possible solution to the above problem would be to have an additional mode of the camera, herein referred to as a limited learning mode. The limited learning mode could be implemented in different ways to circumvent the problem with the test image mentioned above.

In one embodiment, the fact that the camera 302 may be capable of generating and transmitting parallel video streams corresponding to different image settings is used. In such a situation only one video stream is in fact recorded by the sensor of the camera. The parallel video streams are generated by processing the video stream recorded by the sensor with respect to different image settings. Only a group of the image settings, such as brightness and contrast may in this way be applied to the parallel video streams. Others, such as exposure time are not eligible for natural reasons.

In the limited learning mode, only image settings that could be applied to parallel image streams are altered between the sets of image capturing settings 404a-e corresponding to the test images 408a-e. The limited learning mode is thus limited in the image settings that are altered between the test images is limited. In this way, the parallel image streams could be used to acquire the test images without affecting the video being recorded for surveillance or other reasons.

It will be appreciated that a person skilled in the art can modify the above-described embodiments in many ways and still use the advantages of the invention as shown in the embodiments above. For example, the above embodiments have mainly been described with respect to the scene condition types being light condition types represented by histograms. However, as the skilled person realizes, this concept equally applies if the scene condition types correspond to motion blur or noise in image acquired in the images. Thus, the invention should not be limited to the shown embodiments but should only be defined by the appended claims. Additionally, as the skilled person understands, the shown embodiments may be combined.

The invention claimed is:

1. A method performed by an apparatus for configuring a set of image capturing settings of a camera for a first scene condition type currently viewed by the camera, comprising:
   detecting the first scene condition type currently viewed by the camera,
   instructing the camera to acquire a plurality of test images for the first scene condition type, wherein each of said plurality of test images corresponds to a set of image capturing settings to be used by the camera, and wherein at least two test images correspond to different sets of image capturing settings, storing each of said plurality of test images together with its corresponding sets of image capturing settings and data representing the first scene condition type, receiving an input indicating one test image which has been selected from said plurality of test images, and storing the set of image capturing settings corresponding to the selected test image as the configured set of image capturing settings for the first scene condition type to be used by the camera upon future detections of the first scene condition type, wherein the step of receiving the input indicating the one test image which has been selected from said plurality of test images is performed at a later point in time than the step of storing each of said plurality of test images.

2. The method of claim 1, further comprising:
detecting, at a still later point in time, that the camera views the first scene condition type, and
instructing the camera to acquire an image using the stored configured set of image capturing settings for the first scene condition type.

3. The method of claim 1, further comprising:
determining that there is no previously stored configured set of image capturing settings for the first scene condition type before instructing the camera to acquire a plurality of test images for the first scene condition type.

4. The method of claim 1, wherein the first scene condition type currently viewed by the camera is detected by analyzing a temporary image acquired by the camera and determining data representing the first scene condition type.

5. The method of claim 4, wherein the temporary image is analyzed by analyzing an image histogram of light intensities of the temporary image.

6. The method of claim 4, further comprising:
selecting a plurality of sets of image capturing settings to be used by the camera when acquiring the plurality of test images for the first scene condition type, wherein said plurality of sets of image capturing settings are selected based on said temporary image and/or said first scene condition type.

7. The method of claim 6, further comprising:
selecting a first set of image capturing settings based on the temporary image,
defining a range comprising the first set of image capturing settings,
wherein said range is a range in a parameter space in which each set of image capturing settings defines a point, and
selecting the sets of image capturing settings from the range.

8. The method of claim 7, wherein said first set of image capturing settings is determined with respect to a reference object being present in said temporary image.

9. The method of claim 1, further comprising:
dividing the plurality of test images into groups based on their corresponding sets of image capturing settings,
receiving input relating to one of the groups which has been selected, and
receiving input relating to one test image which has been selected from the selected group.

10. The method of claim 1, wherein the first scene condition type relates to at least one of a first light condition type, a first motion blur type, a first image noise condition type, and a first type of objects in the scene.

11. The method of claim 1, wherein each set of image capturing settings include settings relating to at least one of brightness, contrast, color saturation, white balance, gain, flicker free, exposure time, on/off of wide dynamic range, backlight compensation, on/off of infrared cut filter.

12. An apparatus for configuring a set of image capturing settings of a camera for a first scene condition type currently viewed by the camera, comprising:
circuitry configured to
detect the first scene condition type currently viewed by the camera,
instruct the camera to acquire a plurality of test images for the first scene condition type, wherein each of said plurality of test images corresponds to a set of image capturing settings to be used by the camera, and wherein at least two test images correspond to different sets of image capturing settings,
store each of said plurality of test images together with its corresponding set of image capturing settings and data representing the first scene condition type,
receive an input indicating one test image which has been selected from said plurality of test images, and
store the set of image capturing settings corresponding to the selected test image as the configured set of image capturing settings for the first scene condition type to be used by the camera upon future detections of the first scene condition type, wherein
the circuitry is configured to store each of said plurality of test images prior to receiving the input indicating the one test image which has been selected from said plurality of test images.

13. A camera comprising an apparatus according to claim 12.

14. A system for configuring a set of image capturing settings of a camera for a first scene condition type currently viewed by the camera, comprising:
a camera, and
an apparatus according to claim 12.

15. A non-transitory digital storage device comprising computer code instructions which when loaded and executed in a device having processing capabilities performs the method according to claim 1.

* * * * *